United States Patent [19]
de Cavaignac et al.

[11] 3,974,493
[45] Aug. 10, 1976

[54] CURSOR FIND SYSTEM FOR THE DISPLAY OF A WORD PROCESSING SYSTEM

[75] Inventors: Patrick P. de Cavaignac, Parsippany, N.J.; Peter D. Dickinson, Monte Sereno, Calif.

[73] Assignee: Vydec, Inc., Whippany, N.J.

[22] Filed: Apr. 29, 1974

[21] Appl. No.: 464,990

[52] U.S. Cl. .................. 340/324 AD; 340/172.5
[51] Int. Cl.² ........................................ G06F 3/14
[58] Field of Search ....... 340/324 AD, 324 A, 172.5

[56] References Cited
UNITED STATES PATENTS
3,466,645  9/1969  Granberg et al. ............ 340/324 A
3,559,208  1/1971  DiGuigno et al. ........... 340/324 AD Primary Examiner—Marshall M. Curtis
Attorney, Agent, or Firm—Stephen P. Fox

[57] ABSTRACT

In a keyboard entry word processing system, text is stored in a recirculating refresh memory along with a carriage return code at the end of each line. The text is displayed on a CRT screen. A cursor symbol, also displayed on the screen, may be moved by keyboard control to designate a particular character position on the screen where editing is to occur. When the cursor is within the field of displayed text, characters may be edited at the location in memory corresponding to the location of the cursor on the screen. When the cursor is outside the field of displayed text, the cursor is first "found" by altering the refresh memory to provide a new memory location corresponding to the cursor location, and then editing is performed at the new memory location.

15 Claims, 18 Drawing Figures

Fig 1a ONE TO ONE CORRESPONDENCE (PRIOR ART)

Fig 1b STORED CARRIAGE RETURN

CURSOR FIND SYSTEM FOR THE DISPLAY OF A WORD PROCESSING SYSTEM

BACKGROUND OF THE INVENTION

The present invention relates generally to a word processing system for composing and editing a text of characters on a display screen.

One known type of word processing system displays characters on a cathode ray tube (CRT) screen, the format being such that the screen represents a page of text. A refresh memory stores characters to be displayed in coded form. The codes are sequentially read out of memory and applied to a character generator which draws the character on the CRT screen. The entire content of the memory is repeatedly read out many times per second and presented to the character generator to continually draw the characters on the screen and thereby refresh the display.

A keyboard is generally provided, so that displayed text may be edited by either writing or erasing characters on the CRT screen. The character location on the screen where editing is to occur is designated with a marker or cursor symbol. This symbol is displayed on the screen and can be moved to different character locations by operating certain keyboard controls.

Several different techniques for organizing the refresh memory have been used. One method, termed "one-to-one correspondence", is to provide one character location in memory for each character location on the display screen. Thus, if there are 2048 memory locations, the CRT screen can display a total of 2048 characters. Typically, there are 80 characters per line, so about 25 lines of text can be displayed with this method. Control circuitry is provided to produce "carriage return" and "line feed" operations automatically at the right-hand margin of text to deflect the CRT beam to the left margin and step it down one line to begin tracing the first characters of a new line. Since each character in the field of displayed text has a corresponding location in memory, the cursor can be moved anywhere in the display field to designate a position for editing. However, this type of memory format has the disadvantage that memory locations are in effect wasted by storing unused trailing blanks following the last character in a line of text, as well as all unused blanks which form a blank line in the display.

Another method of organizing the refresh memory, termed "stored carriage return" is to store only as many characters in the memory as are actually displayed. Lines of text are of variable length and a "carriage return" (CR) symbol is stored in memory at the end of each line. Also, a CR symbol is stored wherever a blank line is to occur. In operation of this type of system, each time a CR symbol is encountered, the CRT beam is deflected to the left margin and stepped down one line. Unused trailing blanks and blank lines in the displayed text have no corresponding location in memory and do not waste memory space. Consequently, in the case of a 2048-character memory, as described above, the amount of text that can be displayed is generally significantly greater than the 25 lines possible with the "one-to-one correspondence" technique.

When the stored CR memory technique is used and text editing is performed, the cursor is moved to the desired location on the display screen where a character is to be added or deleted. However, it previously has been required to limit cursor movement to the portions of the text that have corresponding character locations in the memory. Cursor movement has been restricted to the forward and backward directions in order to keep track of where the cursor is. In other words, the cursor follows the path of the CRT beam: the only movement permitted is horizontally along a line of text, and vertically downward one line at a time from the end of one line to the beginning of the next line, or upward from the beginning of a line to the end of the next preceding line. One disadvantage of this arrangement is that such restricted cursor movement is performed stepwise one character at a time, and the time required to move the cursor between two points in the text is often undesirably long. Another disadvantage is that characters cannot be quickly added or delected at a location beyond the end of a line because the cursor cannot be moved directly to that location.

SUMMARY OF THE INVENTION

The present invention provides a text display and editing system in which text is stored in memory along with "carriage return" (CR) symbols at the end of each line of text and at places where blank lines are to occur in the text when it is displayed on a screen. The system features a cursor which can be moved to any desired position on the display screen, without restricting movement within the text displayed. Cursor positioning on the screen is achieved rapidly, by keyboard controls, for example. Any location on the screen can be designated for editing by moving the cursor to that location and performing appropriate keyboard operations. This is true even if the cursor designates a location for editing which has no corresponding location in memory, such as a location to the right of the last character in a line. With the system of the invention, efficient use is made of the available memory and it is possible to insert or delete individual characters and entire lines anywhere on the display screen. Other features of the invention will become apparent from the following description.

According to the illustrated embodiment of the invention, a refresh memory stores the lines of text with a CR symbol at the end of each line. Characters are read out of the memory in sequence and displayed on a CRT screen such that a new line of text is started each time a CR symbol is encountered. Also displayed on the CRT screen is a cursor symbol for designating a character position to be edited. When the position of the cursor is below the last line of text, and it is desired to enter a character into memory, the refresh memory is altered by adding CR codes until the CRT beam is shifted down to the same line as the cursor. Also, if the cursor position is beyond the end character in a line and a character is to be added to memory, the refresh memory is altered by adding character locations in the form of space codes until positions of the end character and the cursor coincide. Successive additions of CR and space codes continue automatically step by step, until the cursor has been "found", i.e., until the memory has been altered so that there exists a memory location corresponding to the position of the cursor on the CRT screen. Thereafter, editing is achieved by adding the desired number of characters through keyboard control, and the refresh memory is further altered to accommodate each new character. The stored text, including the newly-added characters, is displayed

DESCRIPTION OF THE PREFERRED EMBODIMENT

Figure 1:
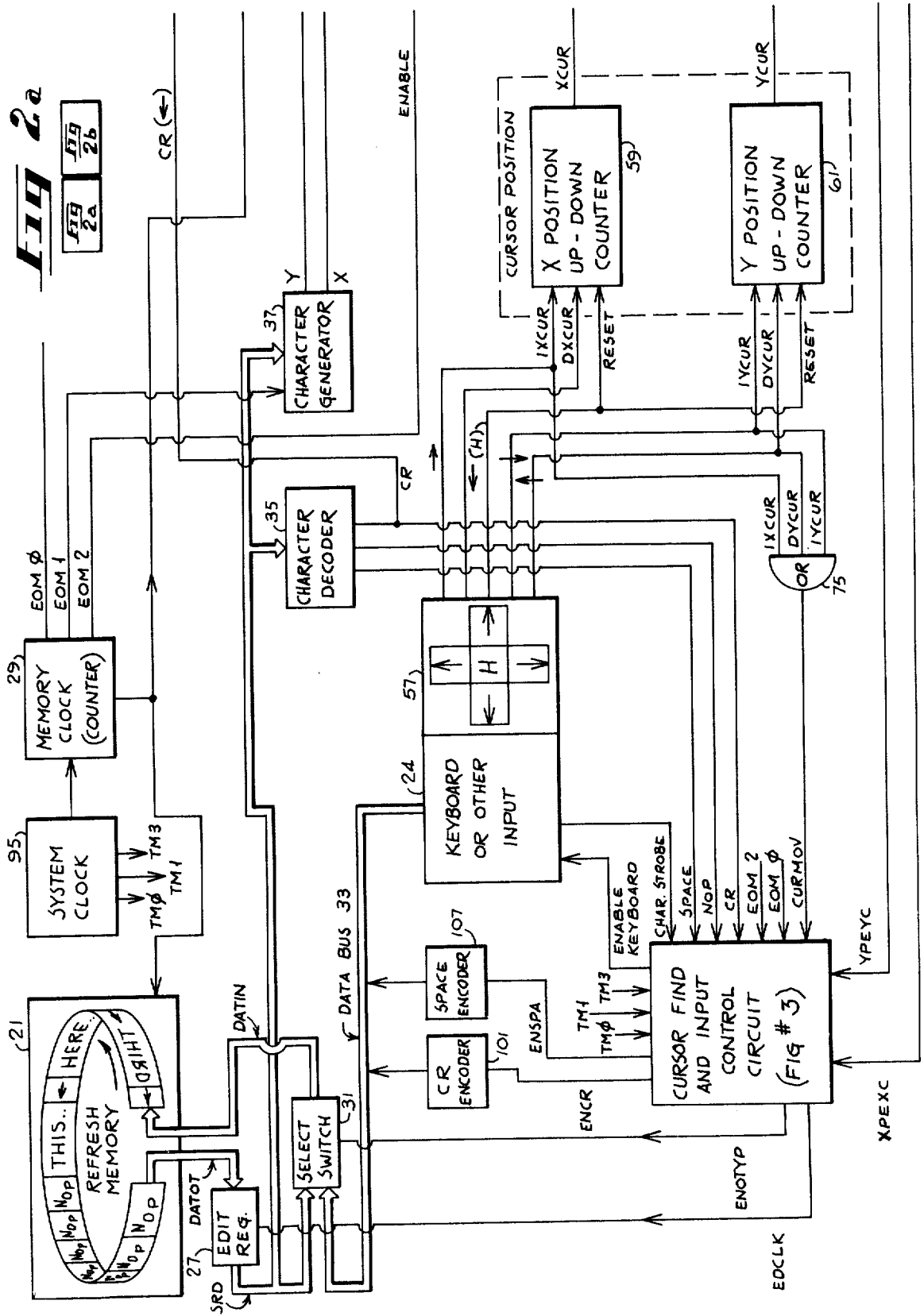
FIGS. 1 (a) and (b) illustrate two methods of memory organization in a word processing system.

Referring now to FIGS. 1 (a) and 1(b), there is illustrated the difference between memory organization of the one-to-one correspondence type and the stored carriage return type in a word processing system. For purposes of illustration, a line of text is made 30 characters long, although in actual practice, the lines of text are typically 80 characters in length. The lines of text illustrated in FIG. 1(a) are stored in sequence in a recirculating memory and applied repeatedly to a CRT display, thereby to refresh the display. Each character location in the recirculating refresh memory has a corresponding character location on the CRT screen, hence the organization is designated the one-to-one correspondence type. In the first line of text, the blank space to the right of the last character on the CRT screen is consumed by six character locations (numbers 25 through 30) in the refresh memory. Display of the second line of text on the CRT screen does not begin until the memory cycles to character location 31. Similarly, the memory contains character locations for each of the blank spaces 52 through 60 of the second line and each of the blank spaces 79 through 90 in the third line. Only three lines are shown; however, subsequent lines of text are stored and displayed in the same manner. It can be seen that this type of memory organization consumes a large number of character locations in the form of blank spaces, merely to insure a one-to-one correspondence between stored text and displayed text. Obviously, the space locations at the end of each line contribute to inefficient use of the memory. In addition, these space locations consume time in each refresh cycle of the memory. Since each refresh cycle is ideally not longer than 1/60 second, to insure adequate display persistence on the CRT screen, the space locations in memory consume time which could otherwise be used more effectively in generating characters of the displayed text.

FIG. 1(b) illustrates the type of memory organization which eliminates the space locations at the end of each line of text. This is the memory organization used by the system of the present invention. At the end of the first line of text, there is stored a carriage return code (CR), designated by the symbol "←". In FIG. 1(b), the first CR code is stored in location 25, and it causes the CRT beam deflection circuitry to perform a carriage return and line feed operation, that is, when the CR code is read out of memory, the CRT beam is deflected down one line and to the left margin to begin tracing the first character of the next line. The second line of text is stored in memory after the CR code, there being no space locations required in the memory to insure synchronization of the display and memory as required in the one-to-one correspondence system described above with respect to FIG. 1(a). CR codes are also stored between the second and third lines (at memory location number 47, and between subsequent lines displayed on the CRT screen. Following the last line of text is additional usable memory in the form of character locations 65 through 87. Thus, for the same length memory, more text can be displayed with the memory arrangement of FIG. 1(b) than that of FIG. 1(a). The unused memory locations at the end of the memory, e.g., character locations 65–90, contain predetermined "no-character" (NOP) codes for purposes of internal system operation, as hereinafter described. As will be described, predetermined "end-of-memory" codes EOM 0, EOM 1 and EOM 2 are generated by the memory clock in synchronism with the last three character locations in the memory for internal timing purposes. These three character locations always contain NOP codes.

The memory organization of FIG. 1(b) permits the storage of text which exceeds the number of lines that can be displayed on the CRT screen. The additional text is in effect stored "below" the screen and can be recalled for display by deleting some of the lines of text displayed and "rolling" the text up onto the screen.

Figure 2:
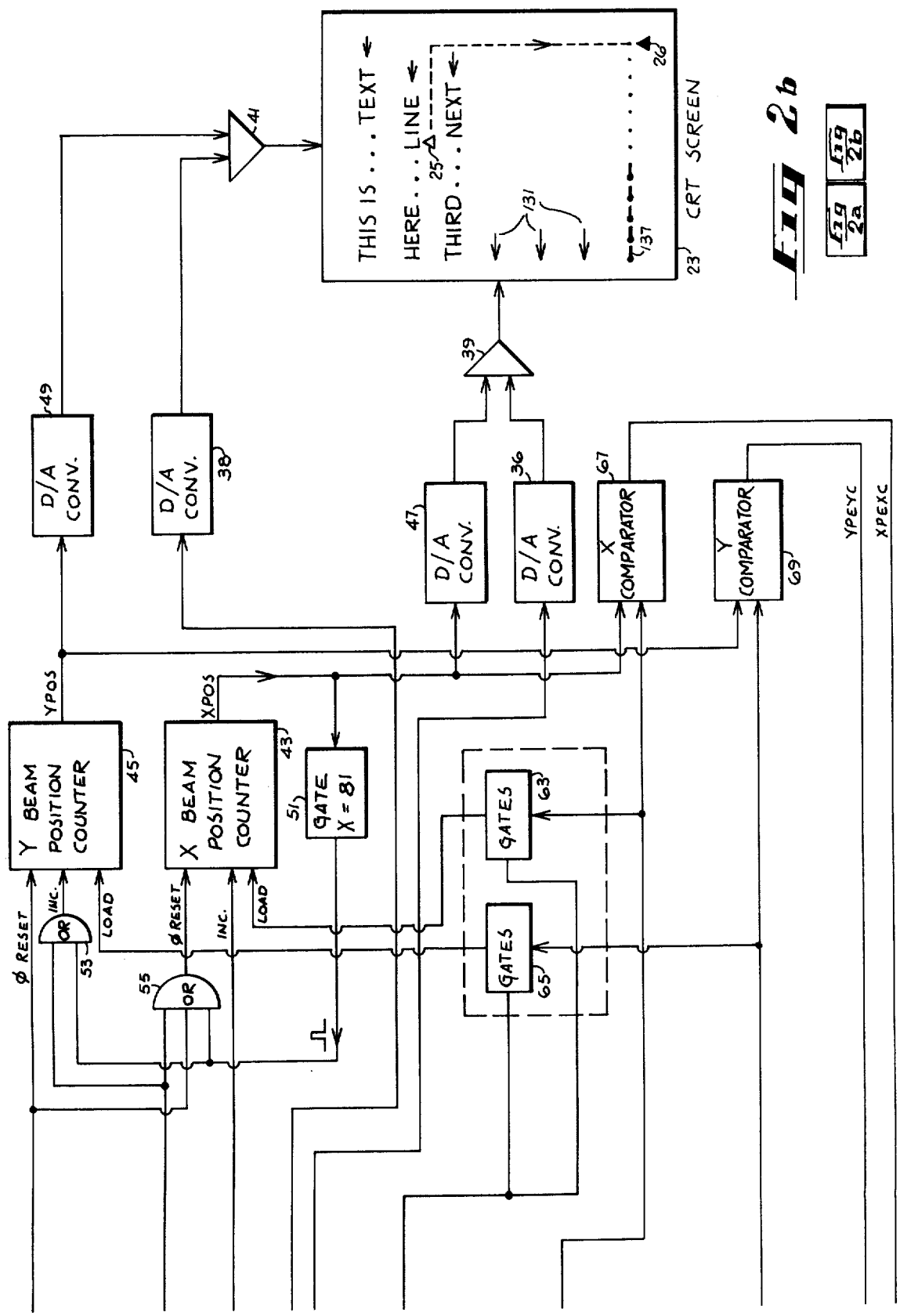
FIGS. 2 (a) and (b) are a block diagram of one embodiment of the word processing system incorporating the present invention.

Referring now to FIG. 2, there is shown a refresh memory 21 which is organized according to the arrangement of FIG. 1(b) using stored carriage return codes between lines of text. The stored text is displayed on a CRT screen 23 in the manner shown. For purposes of illustration, the carriage return symbol, ←, is shown on the display. However, in practice, this symbol is usually blanked. In response to each CR code, the CRT beam is shifted down one line and to the left margin to begin tracing the next line of text. In addition, if a line of characters is filled before a CR code is encountered in the memory, the control circuit in the system automatically shifts the CRT beam to begin a new line of text. Thus, there are no character locations in the memory which correspond to the blank space to the right of the last character in each line of text. Also, in the case of the illustrated example, where there are only three lines of text, there are no designated character locations in the memory for the blank space below the last line of text on the CRT screen.

Editing of the text displayed on the screen may be achieved by first designating the location on the screen to be edited with a marker or cursor symbol. In the illustrated embodiment, the cursor symbol is triangular in form and is shown on the CRT screen by reference numeral 25. The term "editing", as used herein, refers to the insertion, deletion, or change of text anywhere on the CRT screen. Movement of the cursor 25 to the desired location on the screen where editing is to occur is achieved through operation of a keyboard 24 or other input control, as hereinafter described.

For purposes of illustration, it is supposed that additional characters of text are desired to be added on the CRT screen at the place designated by reference numeral 26 as shown in FIG. 2. It will be recalled from the foregoing description that, unlike the one-to-one correspondence type of memory organization, there is no character location in memory corresponding to position 26 in the stored carriage return type of memory organization used herein. To achieve text editing, the cursor position 26 on the CRT screen must first be coordinated with an appropriate character location in the refresh memory 21. In other words, the cursor must be "found" relative to the locations in the refresh memory.

The system of the present invention enables the cursor to be found regardless of where it is on the CRT screen. It is through the cursor find system that text may be stored most efficiently in the refresh memory while still permitting complete freedom in adding, deleting, or changing characters anywhere on the display screen.

A more complete understanding of the cursor find system may be obtained when viewed in conjunction with a detailed description of the word processing system of FIG. 2. The output of the refresh memory 21 is applied, character by character, to an edit register 27 in synchronism with pulses from a memory clock 29. Memory clock 29 includes a counter and logic circuit (not shown) which counts the character locations in memory 21 and produces the output signals EOM 0, EOM 1 and EOM 2.

Each character in memory is represented by an eight bit binary code. The edit register comprises eight one-bit latches which hold data at their inputs for one cycle of the memory clock. Edit register 27 has a control input EDCLK, and characters are passed through the edit register as long as the EDCLK input is high. Data at the output of the edit register is designated SRD and is applied through a select switch 31 back to the input of the refresh memory 21 as data designated DATIN. Select switch 31 has a control input ENOTYP. When ENOTYP is low, SRD data is returned to the DATIN input of the refresh memory 21, thereby to maintain the recirculating loop closed. When ENOTYP is high, the select switch applies data to the DATIN input of the refresh memory from a data bus 33 instead of from the SDR output of the edit register 27, in a manner hereinafter described.

The coded characters at the output of the edit register 27 are also applied to a character decoder 35 and to a character generator 37, which for each character produces a plurality of predetermined X and Y ditital signals for controlling the beam of the CRT display 23 to trace in sequence vectors forming each character. Character generator 37 may be of the type described in U.S. Pat. No. 3,660,833, issued May 2, 1972 and assigned to the same assignee as the present invention.

The X and Y signals from the character generator 37 are applied through digital to analog converters 36, 38 to X and Y deflection amplifiers 39, 41 respectively, for the CRT beam. Movement of the CRT beam from one character location to another is controlled by circuitry including X and Y beam position counters 43, 45 respectively. Each counter is of the up-down presettable type and has a 0 reset input, an increment (INC) input and a LOAD input. The digital outputs of the X and Y counters 43, 45 are converted to analog signals by digital-to-analog converters 47, 49 and applied to the X and Y deflection amplifiers 39, 41 respectively. As the counters are incremented, the reference voltages on the horizontal and vertical deflection plates of the cathode ray tube are shifted incrementally, thereby to move the beam from one character location to the next, or from one line location to the next, Step-by-step horizontal movement of the CRT beam is achieved by incrementing the X beam position counter 43 in synchronism with output signals from the memory clock 29 which controls the character-by-character output of the refresh memory 21. Vertical stepping of the CRT beam from line to line is achieved by incrementing the Y beam position counter 45 each time a carriage return code (CR) is decoded by the character decoder 35. As described above, the CR code is stored in the refresh memory 21 at the end of each line of text. Vertical stepping of the CRT beam is also achieved automatically at the end of each line of text by a gate 51 which produces an output pulse in response to the X beam position counter 43 counting the 81st character of a line. As shown, the output gate 51 is applied through an OR gate 53 to the INC input of the Y beam position counter 45.

A new line of text is started when the X beam position coutner 43 is reset to zero. This occurs when a reset pulse is applied through an OR gate 55 from gate 51 in response to the end of a line, or from the character decoder 35 in response to a CR code within the stored text in the refresh memory 21, or in response to the end of a page of text as indicated by the occurrence of an EOM 0 signal from memory clock 29 in coincidence with the last character in the recirculating memory (see FIG. 1($b$)). The EOM 0 signal is also applied to the 0 reset input of the Y beam position counter 45. Thus, with each recirculation of the refresh memory, the beam of the CRT display begins a new trace at the upper left corner of the display screen.

After a complete page of text has been traced, the X and Y beam position counters 43, 45 are set to selected counts through their LOAD inputs, thereby to move the CRT beam to a selected position on the screen for tracing of the cursor symbol.

Movement of the cursor on the CRT screen is controlled through means such as a set of five cursor position control keys 57 on a keyboard. As shown, there are four keys for moving the cursor one step at a time in the left, right, up and down directions. The fifth key, designated H, moves the cursor to a home position which is the first character location at the upper left corner of a page of text. Five signal lines, corresponding to the five cursor position control keys 57, are coupled to X and Y position up-down counters 59, 61, respectively. More particularly, the right and left movement keys produce signals which are applied to the increment (IXCUR) and decrement (DXCUR) inputs of the X position up-down counter 59. Each time one of these keys is operated, the counter is incremented or decremented by one count. Similarly, the down and up movement of the cursor is controlled by applying signals from the down and up keys to the increment (IYCUR) and decrement (DYCUR) inputs of the Y position up-down counter 61. These two counters are reset to zero in response to signals on their reset inputs from operation of the home (H) key.

The X cursor position (XCUR) and the Y cursor position (YCUR) contained in the X and Y position up-down counters 59, 61 are gated to the LOAD inputs of X and Y beam position counters 43, 45, respectively, through corresponding gates 63, 65. The loading of the counts from counters 59, 61 to counters 43, 45 occurs when the third-to-last character of a page of text is read out of the refresh memory 21. This occurs in coincidence with the EOM 2 signal from memory clock 29 (see FIG. 1($b$)). The EOM 2 signal enables gates 63 and 65.

When the X and Y beam position counters 43, 45 are loaded with the count corresponding to the position of the cursor symbol 25, the beam is moved to that position on the CRT screen. As described above, this occurs in response to the EOM 2 signal, which coincides with the third-to-last NOP code in memory. The next NOP code read out of the refresh memory occurs in coincidence with the EOM 1 signal (see FIG. 1(b)), which is applied to the character generator 37 to cause the CRT beam to trace the triangular-shaped cursor symbol 25. Thus, in the overall sequence of operation of the system, a page of text is read out from the refresh memory 21 and traced on the CRT screen, then the X and Y beam position counters are set to the cursor position determined by keyboard control and the CRT beam moved to that position. Lastly, the cursor symbol is drawn at that position by the character generator 37.

With each complete recirculation of the refresh memory 21, a full field of text is displayed on the CRT screen 23. As described above, the characters are traced one by one in synchronism with successive cycles of the memory clock 29. During each memory clock cycle, the contents of the cursor counters and the CRT beam position counters are compared, and when coincidence occurs, select swith 31 and edit register 27 can be controlled to appropriately edit the character which is being read out of the refresh memory 21 at that moment in time. The successive comparisons are achieved by an X comparator 67 which compares the counts in counters 43, 59, and by a Y comparator 69 which compares the counts in counters 45, 61. When coincidence occurs, the X comparator produces an output signal XPEXC, and the Y comparator 69 produces an output signal YPEYC. As described hereinafter, the XPEXC and YPEYC signals are permitted to occur only in response to coincidence of the cursor and a character which is contained within the field of text between the first and last characters of text.

When the CRT beam reaches the character location corresponding to the cursor location, keyboard-controlled editing circuitry, described later, produces ENOTYP and EDCLK signals to control the select switch 31 and edit register 27 in predetermined sequences to gate character signals from data bus 33 into the character location appearing at that time at the input to the refresh memory. The character then appearing at the SRD input to select switch 31 is either dropped or held, depending on the state of the EDCLK control input to register 27. In the case where the character is dropped, a new character from the keyboard 24, for example, is substituted for the old character. In other words, the new character overtypes the old character. In the case where edit register 27 holds the character read out from the refresh memory, the new character is inserted in a newly-provided character location in memory. In either case, on the next succeeding memory cycle, select switch 31 is controlled to again receive character codes from the output of the memory through edit register 27 and apply the character codes to the input of the memory. This arrangement permits one character location in the memory to be edited each time the memory recirculates, and the particular character location which is edited is determined by the location of the cursor on the CRT screen.

The foregoing description of text editing assumes that the cursor symbol is located within the field of text displayed, and that the X and Y comparators 67, 69 indicate coincidence of the cursor and CRT beam at some point in time before the refresh memory 21 completes one recirculation. However, this will not always be the case when it is desired to perform text editing anywhere on the CRT screen by providing complete freedom of movement of the cursor symbol. For example, with reference to the text displayed on the CRT screen 23, assume that the first word stored in the refresh memory is "This" and the last word stored in the memory is "next". Further, assume that the cursor has just been moved through keyboard control of keys 57 from its original position indicated by the triangular outline to a new position indicated by the solid triangle 26 along the path indicated by the dashed lines between the two cursor positions. If it is desired to add characters beginning at cursor position 26, the problem is that there is no character location in the refresh memory which corresponds to the position of the cursor 26 on the CRT screen. In this situation, the cursor at position 26 is lost relative to any character location in the refresh memory.

With the system of the present invention, the cursor at its new position 26 can be "found", i.e., correspondence can be established between the position of the cursor on the CRT screen and a character location in the refresh memory. This is achieved in the manner described below.

Figure 3:
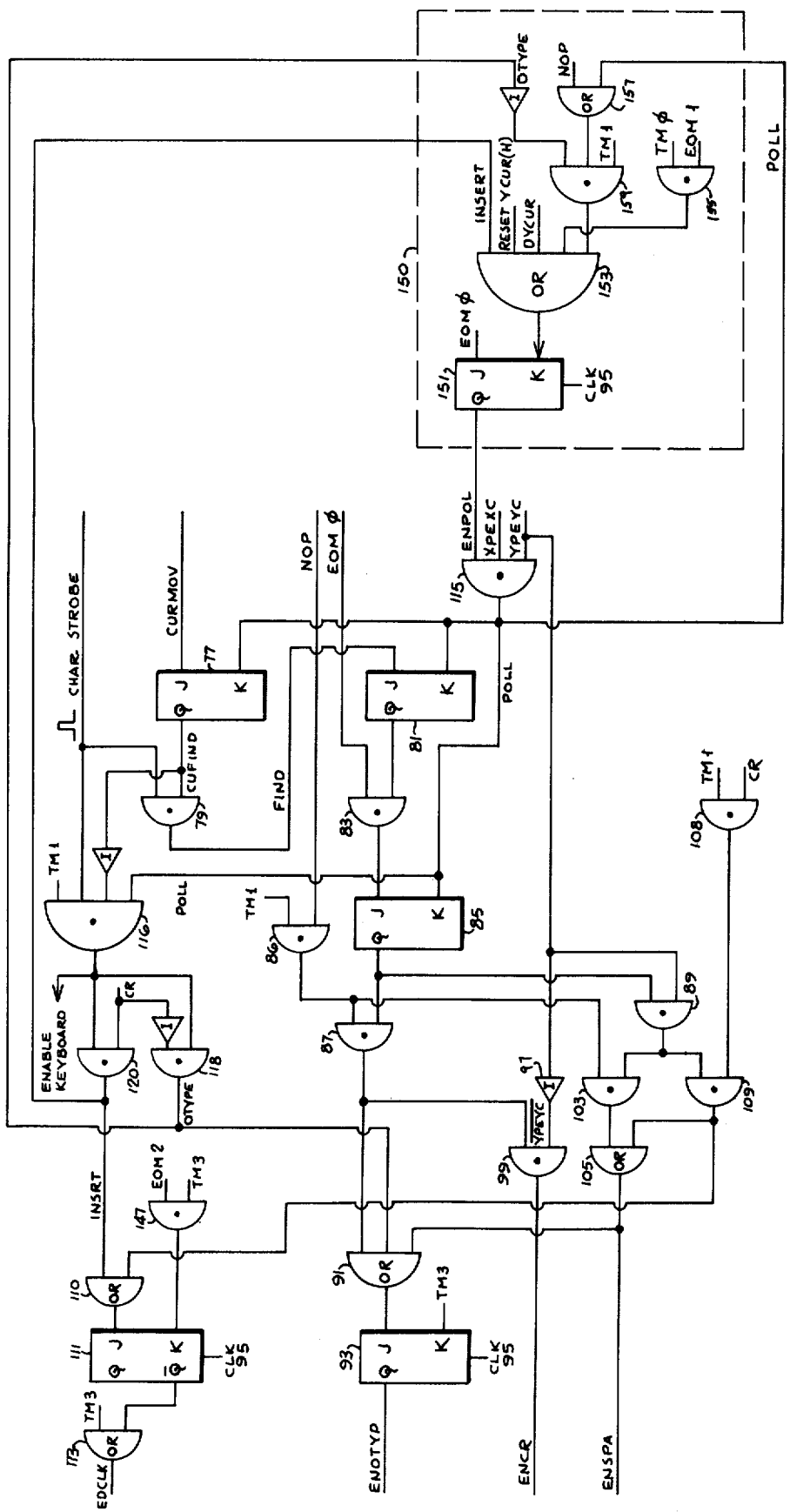
FIG. 3 is a diagram of the cursor find and input control logic shown in FIG. 2.

With reference to FIGS. 2 and 3, each time the cursor is moved one position to the right, or one position up or down, through keyboard control, on the CRT screen, a CURMOV signal is produced at the output of an OR gate 75. These movements produce the IXCUR, DYCUR and IYCUR signals shown as the inputs to OR gate 75. Also, these movements are the ones which are capable of moving the cursor out of the field of text stored in the refresh memory 21. The CURMOV signal is applied to the J input of a J-K flip-flop 77 (FIG. 3), thereby to set the flip-flop and produce a CUFIND signal at the Q output thereof. Thereafter, when a character key on the keyboard (FIG. 2) is depressed, a character strobe pulse is applied along with the CUFIND signal to an AND gate 79, which in response thereto produces a FIND signal to set a J-K flip-flop 81. When set, the Q output of flip-flop 81 goes high. Upon completion of the first recirculation of refresh memory 21 following the operation of a key on the keyboard, the EOM 0 signal along with the high level signal at the Q output of flip-flop 81 is applied to an AND gate 83, which produces an output signal to set a flip-flop 85. As a result, the Q output of flip-flop 85 provides an enabling output to condition two AND gates 87, 89. As will be recalled from the foregoing description, the organization of refresh memory 21 is such that unused character locations contain NOP codes. Consequently, after flip-flop 85 is set, character decoder 35 produces a NOP signal in response to the first unused character location encountered at the output of memory 21 following a field of text. This NOP signal is applied through an AND gate 86 to AND gate 87. Gate 86 insures that the NOP signal occurs in synchronism with a timing signal TM 1 at a predetermined time during the memory clock cycle, as hereinafter described. The output signal from gate 87 is applied to an OR gate 91 to set a J-K flip-flop 93. When set, flip-flop 93 produces an ENOTYP signal at the Q output thereof, thereby to cause select switch 31 to receive data from the data bus 33 instead of the output of refresh memory 21.

Assuming that the vertical position of the cursor is not in the same line of text as the position of the CRT beam when the first NOP code is read out of refresh memory 21, comparator 69 (FIG. 2) will indicate no coincidence between the Y coordinates of the CRT beam and the cursor. Consequently, the YPEYC output thereof will be low. This signal is applied through an inverter 97 (FIG. 3), the output of which is applied along with the output of AND gate 87 to an AND gate 99. As a result, AND gate 99 produces an ENCR signal which enables an encoder 101 (FIG. 2) to apply a carriage return code through select switch 31 to the input of refresh memory 21. The ENOTYP and ENCR signals occur at the same time, thereby to cause the NOP code in the first unused character location in memory 21 to be overtyped with a carriage return code (CR) designated by the symbol " ← ". During the next cycle of refresh memory 21, the newly-added carriage return code causes the CRT beam to be shifted down one line. Operation of the circuit of FIG. 3 continues in the above-described manner, overtyping NOP codes with carriage return codes in successive memory locations in synchronism with consecutive machine cycles until comparator 69 indicates coincidence between the Y coordinates of the CRT beam and the cursor. At this time, the cursor is in the same line as the CRT beam, and the YPEYC signal goes high, thereby to enable AND gate 89. If the next code read out of refresh memory 21 is a NOP code, indicating an unused character location, AND gate 103 is enabled, and the output signal therefrom is applied through an OR gate 105 and OR gate 91 to set flip flop 93 as described above, thereby to produce the ENOTYP signal. The output of OR gate 105 also constitutes an ENSPA signal which enables a space encoder 107 (FIG. 2) to produce a space code on data bus 33 for transmission through select switch 31 to the input of refresh memory 21. Consequently, in this case, the unused character location in memory is overtyped with a space code.

If the first character code read out of refresh memory 21 after coincidence of the Y coordinates of the CRT beam and the cursor (as indicated by the YPEYC signal) is a carriage return code, it is applied through and AND gate 108 in synchronism with timing pulse TM 1 to enable an AND gate 109. The output of AND gate 109 is applied through OR gate 105 to produce the ENSPA signal. Also, the output of AND gate 109 is applied through an OR gate 110 to the J input of a J-K flip-flop 111, thereby to set this flip-flop. As will be described hereinafter, when flip-flop 111 is set, an EDCLK signal from an OR gate 113 goes low except to transmit TM 3 clock pulses, thereby to control the edit register 27 to hold the output of refresh memory 21 for one memory cycle. At the same time that the edit register 27 holds the memory output, the ENOTYP and ENSPA signals cause the next character location in the memory to be overtyped with a space code applied from data bus 33 through select switch 31. Thus, in effect, when a carriage return (CR) code is encountered at the output of refresh memory 21, it is not destroyed, but is held while a space code is inserted ahead of it. Consequently, the carriage return code is "pushed" horizontally to the end of a line of newly-added spaces in the refresh memory.

New spaces are either typed over unused (NOP) character locations in the memory, or inserted ahead of a carriage return code in the memory, one at a time, until the X coordinate of the CRT beam is equal to the X coordinate of the cursor. At this time, the comparators 67, 69 produce XPEXC and YPEYC signals in coincidence, and these signals (along with an ENPOL signal described below) enable and AND gate 115, the output of which is a POLL signal that resets flip-flops 77, 81, 85.

By the time POLL occurs, the memory has been altered to provide a character location which corresponds to the position of the cursor on the screen. In other words, the cursor has been "found". At this time, an AND gate 116 is enabled in synchronism with a TM 1 interval timing pulse. The output of gate 116 enables keyboard 24 to cause a character therefrom to be read onto data bus 33 and thence into the refresh memory through select switch 31. The output of AND gate 116 also is applied to two AND gates 118, 120. If the character at the memory output when the keyboard is enabled is a CR code, AND gate 120 sets flip-flop 111. Consequently, the EDCLK signals control edit register 27 to cause the keyboard character to be inserted ahead of the CR code, in the manner described below. If the character at the memory output is not a CR code, AND gate 118 operates to set flip-flop 93, thereby to produce an ENOTYP signal which permits the character in memory to be overtyped by the keyboard character.

Characters from the memory 21 can be overtyped with new characters (from the keyboard, for example) in successive machine cycles, i.e., at each advance of the memory to a new character location. However, when a new character is to be inserted ahead of an existing character in memory such as a CR code, the insertion operation takes place once during each recirculation of the memory. Operational timing for accessing the memory 21 from keyboard 24 is insured by the POLL signal at AND gate 116. This signal in turn depends on the ENPOL signal at the input to AND gate 115. When ENPOL goes low, so does POLL, thereby to prevent entry of characters to the memory.

The ENPOL signal is produced in response to a number of conditions by the circuit within dashed outline 150. ENPOL is obtained from the Q output of J-K flip-flop 151 which is set at its J input by an EOM 0 signal from memory clock 29 in synchronism with each recirculation of memory 21. As long as flip-flop 151 is set and the position of the CRT beam equals that of the cursor, character editing can take place. When flip-flop 151 is reset through its K input, editing is prevented for the remainder of the refresh cycle of the memory. This occurs in response to any of the following signals applied through an OR gate 153: (1) INSRT which indicates that a CR code has been encountered at the output of memory 21; (2) RESET YCUR, which indicates that the cursor has been moved to the first line of text, as by operation of the home position (H) key of cursor position keys 57 (FIG. 2); (3) DYCUR, which indicates that the cursor has been decremented back into the field of displayed text; (4) EOM 1 in synchronism with timing pulse TM 0 through and AND gate 155, which indicates that the recirculating memory is at its second-to-last character location in the cycle; and (5) NOP or POLL through an OR gate 157 in synchronization with timing pulse TM 1 when the system is not operating in the overtype mode, as provided by an AND gate 159. The last-mentioned NOP signal condition indicates that the second usable NOP location is being read out of memory 21 at a time when only one editing operation can occur per refresh cycle; and the last-mentioned POLL signal indicates that the CRT beam has arrived at the position of the cursor.

The overall operation of the circuit of FIG. 3 can be understood with reference to the flow diagram of FIG.

Figure 4:
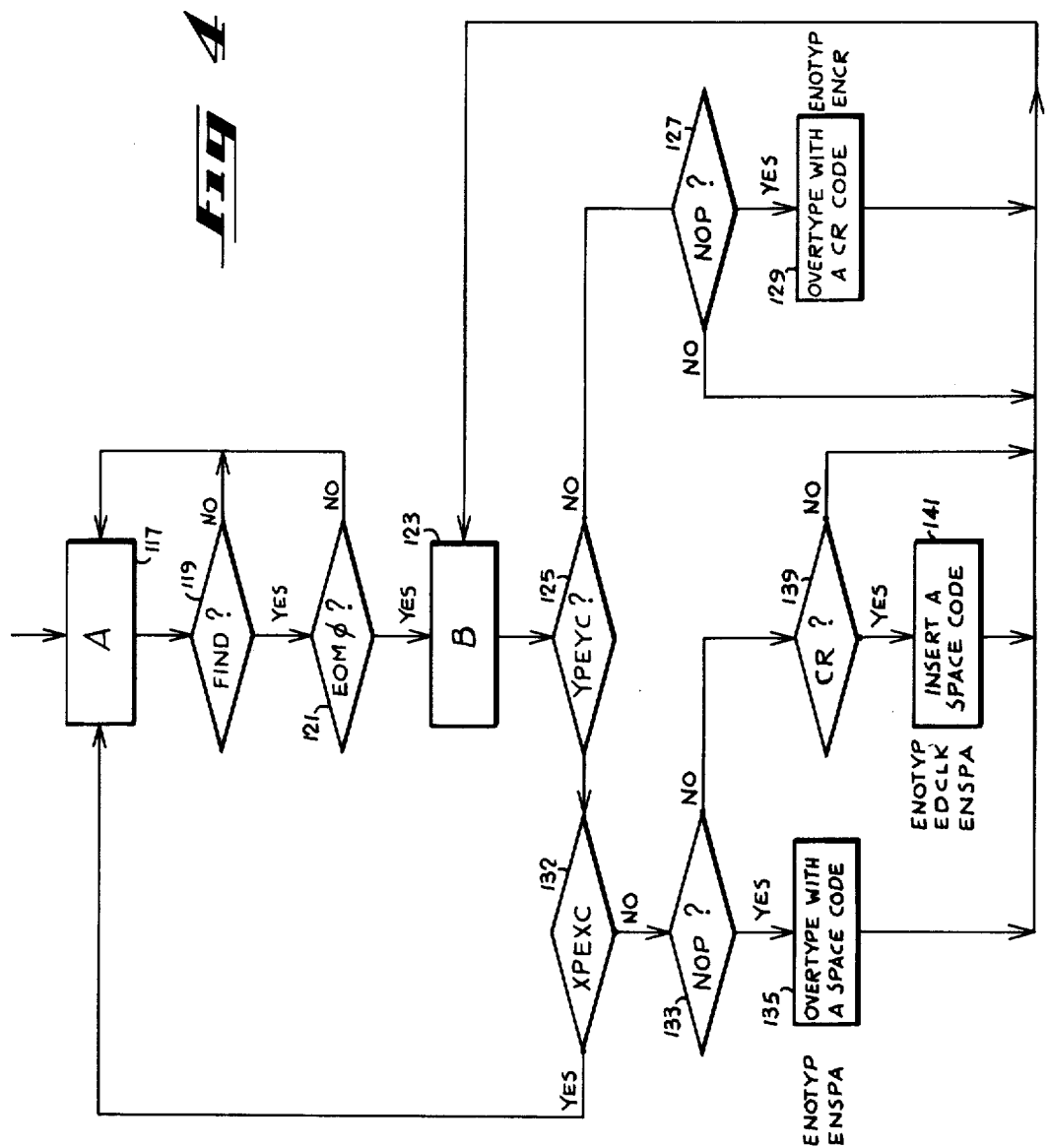
FIG. 4 is a flow diagram illustrating the operation of the control logic of FIG. 3.

4. Operation progresses from one block to the next in synchronism with the system and memory clock signals. Starting from state A, i.e., block 117, the existence of a FIND signal is first checked by decision block 119. It will be recalled from the description of FIG. 3, that as long as the cursor is within the field of displayed text, the XPEXC and YPEYC signals will be produced with each recirculation of the refresh memory, and that consequently flip-flop 77 will be reset during each recirculation. As a result, no FIND signal will be produced, and operation will return to state A in the flow diagram of FIG. 4. However, when the cursor is moved outside the field of text, there is a FIND signal produced in response to a character strobe and CU-FIND signal, and operation advances to decision block 121 where it is determined if an EOM 0 signal from memory clock 29 has occurred. If so, the refresh memory 21 is at the beginning of its refresh loop; the X and Y beam position counters 43, 45 have been set to zero; and the CRT beam has been moved to the upper left corner of the screen to begin tracing a new page of text. As soon as this set of conditions occurs, operation advances to state B, shown by block 123. Next, the Y coordinates of the CRT beam and the cursor are compared by checking to see if a YPEYC signal indicating coincidence has occurred, as indicated by decision block 125. If the Y coordinates are not the same, operation branches to decision block 127, which tests the output of character decoder 35 (FIG. 2) to determine if a NOP code is present at the output of refresh memory 21. If not, operation returns to state B; and if so, operation advances to block 129 to overtype the unused character in the refresh memory 21 with a carriage return (CR) code. This is achieved by the circuit of FIG. 3 producing the ENOTYP and ENCR signals in the manner described above. Thereafter, operation returns to state B.

As long as the Y coordinate of the CRT beam is not equal to that of the cursor, operation continues through blocks 125, 127, 129 to expand the text one line at a time by adding carriage return codes in succession in the memory. In the example shown on the CRT screen 23 (FIG. 2), the added carriage return symbols are indicated by the reference numerals 131. Ultimately, the beam will be stepped down to a position such that the Y coordinates of the beam and the cursor are the same. In this case, operation branches from decision block 125 to decision block 132, wherein the X coordinates of the CRT beam and the cursor are compared by checking to see if an XPEXC signal indicating coincidence has occurred. If so, the cursor has been "found" and operation returns to state A. If not, operation goes to decision block 133 wherein the contents of the next character position in memory is tested for the presence of an unused character location, as indicated by a NOP signal from the output of character generator 35. If a NOP signal is detected, operation advances to block 135, and the circuit of FIG. 3 produces ENOTYP and ENSPA signals in the above-described manner to overtype the NOP code in the refresh memory with a space code, thereby advancing the CRT beam one increment horizontally to the right on CRT screen 23, as indicated by the space 137 (FIG. 2). Successive iterations of operation through state B cause spaces to be added one after another until the X coordinate of the CRT beam is equal to that of the cursor. In the event that the test for an NOP code at decision block 133 produces negative results, a test is than made at decision block 139 to determine if the character location at the output of refresh memory 21 contains a carriage return (CR) code instead. If not, operation returns to state B; and if so, operation advances to block 141. The circuit of FIG. 3 then produces the ENOTYP, the EDCLK, and the ENSPA signals, as described above, to insert a space code in the memory before the CR code. The purpose of decision block 139 and block 141 is to insure that CR codes are not overtyped in the memory since, without such codes, there would be no way of distinguishing between lines of text displayed on the CRT screen 23.

When enough spaces have been added in unused character locations in refresh memory 21, the X position of the CRT beam will equal that of the cursor. Thus, when decision block 132 detects XPEXC from comparator 67 (FIG. 2), operation is transferred back to state A, i.e., block 117, and the circuit of FIG. 3 remains reset until the cursor is once again moved outside of the field of text.

FIGS. 5(a) –(l) illustrate the timing sequence for overtyping and inserting characters in refresh memory 21. By comparing FIGS. 5(a), (b) and (c), it can be seen that each machine cycle of the system of FIG. 2 corresponds to one cycle of the refresh memory 21. Each machine cycle contains five cycles of the system clock 95. The system clock includes a 0–4 counter which produces TM 0, TM 1 and TM 3 timing pulses in each machine cycle, as shown in FIG. 5(d). The TM 3 pulse is used to reset flip-flop 93 (FIG. 3) to: (1) terminate the ENOTYP signal; (2) reset flip-flop 111 through an AND gate 147 in synchronism with an EOM 2 signal from memory clock 29; and (3) produce an EDCLK pulse through AND gate 113.

Figure 5:
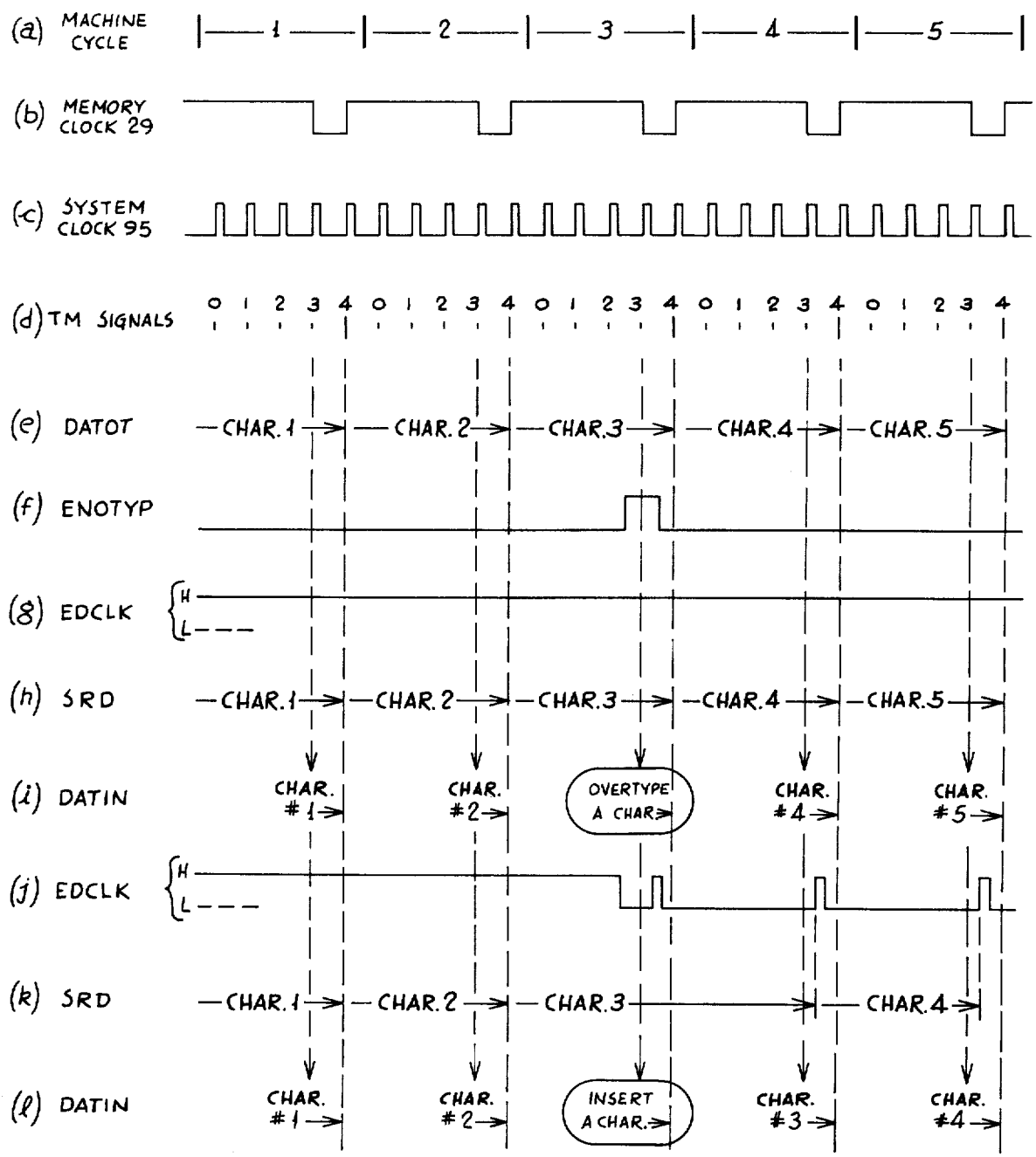
FIGS. 5 (a)–(l) are timing diagrams illustrating the operation of the system of FIGS. 2 and 3.

By comparing FIGS. 5(e), (h) and (i), it can be seen that characters appear at the output of refresh memory 21, i.e., at the DATOT line, and at the output of edit register 27, i.e., at the SRD line, for an entire cycle of the memory clock 29; however, the characters appear at the input to the refresh memory, i.e., at the DATIN line, only for the time between the last two pulses of the system clock during each machine cycle. As long as the EDCLK signal remains high (H), as shown in FIG. 5(g), the character code on the SRD line will follow the character code on the DATOT line. When an ENOTYP signal occurs, as shown in FIG. 5(f), the character code on the SRD line will be lost when select switch 31 (FIG. 2) is operated to receive codes from data bus 33 instead of the SRD line. Thus, for the example shown in FIG. 5, character number 3 is lost. In effect, it is overtyped with a new character from the data bus 33.

FIGS. 5(j), (k) and (l) illustrate the timing when a character is inserted in the refresh memory 21. When the EDCLK signal goes low (L), as shown in FIG. 5(j), the edit register 27 holds the character at the DATOT line on the SRD line for an additional cycle of the memory clock. This can be seen from a comparison of FIGS. 5(e) and (k). At the time that a character is held in this manner, a new character is inserted into the refresh memory from data bus 33 through select switch 31 (FIG. 2), as shown for the DATIN line of FIG. 5(l). Thereafter, characters are gated from the DATOT line through edit register 27 to the SRD line in synchronism with short EDCLK pulses. In the illustration of FIGS. 5(j), (k) and (l), character number 3 is held at the SRD line while a new character is inserted in the refresh memory. Subsequent characters read out of the refresh memory in the same recirculation cycle are delayed one character in time. When the next recirculation of the refresh memory begins, the EDCLK signal goes high, and operation resumes in the manner shown for characters 1 and 2 in FIG. 5.

We claim:

1. A method for editing multi-character lines of text including alphanumeric symbols and formatting symbols comprising:
   storing said lines of text contiguously in a refresh memory with an end-of-line symbol at the end of each line of characters;
   sequentially reading characters of text out of said refresh memory;
   displaying the characters of text read out of said refresh memory, including starting a new line of text in response to each end-of-line symbol read out of said refresh memory;
   designating with a cursor symbol a character display position to be edited; and
   selectively altering the text stored in said refresh memory, including
      adding predetermined character symbols in said memory after the last character in a line when the display position of the cursor symbol is beyond the display position of said last character and in the same line; and
      adding predetermined end-of-line symbols in said memory after the last line of displayed text when the display position of the cursor symbol is beyond said last line.

2. The method of claim 1 further including a final step of accessing said refresh memory for external editing when the display position of the cursor symbol coincides with the display position of a new usable character location provided in the altered memory.

3. The method of claim 2, wherein the step of storing said text includes:
   storing a plurality of multi-character, variable length lines of text in serial fashion; and
   storing predetermined no-character codes in unused memory locations following said text.

4. The method of claim 3, wherein the step of displaying the characters of text includes:
   producing an end-of-memory signal in synchronism with the no-character code in the last memory location; and
   starting a new page of text in response to said end-of-memory signal.

5. The method of claim 3, wherein said refresh memory recirculates in successive operating cycles and wherein:
   the step of adding character symbols in said memory after the last character in a line includes overtyping no-character codes with predetermined space codes; and
   the step of adding end-of-line symbols in said memory after the last line of displayed text includes overtyping no-character codes with predetermined carriage return codes.

6. The method of claim 3, wherein said refresh memory recirculates in successive operating cycles and wherein the step of adding character symbols in said memory after the last character in a line includes: inserting predetermined space codes in said memory before an end-of-line symbol in synchronism with the recirculations thereof in the case where said end-of-line symbol is contained in the memory location next succeeding said last character, thereby to preserve and move said end-of-line symbol to a later memory location.

7. A system for editing multi-character lines of text including alphanumeric symbols and formatting symbols comprising:
   recirculating refresh memory means for contiguously storing multi-character, variable length lines of text with a predetermined end-of-line code at the end of each line of characters;
   means for sequentially reading characters of text out of said refresh memory and reinserting said characters in said memory;
   means for displaying the characters of text read out of said refresh memory including means for starting a new line of text in response to each end-of-line code read out of said memory, said display means including character generator means for producing characters and a cursor symbol;
   means for positioning said cursor symbol to designate a character display position to be edited;
   means coupled to said sequential character reading and reinserting means for selectively altering the text stored in said refresh memory, said altering means including:
      first means responsive to said cursor positioning means for adding predetermined character codes in said memory after the last character in a line when the display position of said cursor is beyond the display position of said last character and in the same line; and
      second means responsive to said cursor positioning means for adding end-of-line codes in said memory after the last line of displayed text when the display position of said cursor is beyond said last line.

8. The system of claim 7, further including means coupled to said sequential character reading and reinserting means for accessing said refresh memory to perform external editing when the display position of said cursor coincides with the display position of a new character location provided in the altered memory.

9. The system of claim 8, wherein said display means includes a cathode ray tube display screen, said accessing means includes an alpha-numeric and function control keyboard, and said cursor positioning means includes directional positioning keys.

10. The system of claim 8, wherein said recirculating refresh memory means contains a predetermined no-character code in each vacant memory location following said text.

11. The system of claim 10, wherein said display means includes means for producing an end-of-memory signal in synchronism with the no-character code in the last memory location; and means for starting the display of a new page of text in response to said end-of-memory signal.

12. The system of claim 10, wherein said means for selectively altering the text stored in said refresh memory includes a space encoder and a carriage return encoder, and wherein:
   said first means for adding character locations in said memory after the last character in a line includes means for controlling said space encoder and said sequential character reading and inserting means to overtype said no-character codes with space codes; and
   said second means for adding end-of-line codes in said memory after the last line of displayed text includes means for controlling said carriage return encoder and said sequential character reading and inserting means to overtype said no-character codes with carriage return codes.

13. The system of claim 12, wherein said refresh memory steps from one memory location to the next in successive machine cycles and the control means of said first and second adding means operates in synchronism with said refresh memory to overtype one no-character code during each machine cycle of said memory.

14. The system of claim 10, wherein said means for selectively altering text stored in said refresh memory includes a space encoder and wherein said first means for adding character locations in said memory after the last character in a line includes: means for controlling said space encoder and said sequential character reading and reinserting means to insert space codes in said memory before an end-of-line code when said end-of-line code is contained in the memory location next succeeding said last character, thereby to preserve and move said end-of-line code to a later memory location.

15. The system of claim 14, wherein said refresh memory recirculates in successive operating cycles and the control means of said first adding means operates in synchronism with said refresh memory to insert one space code during each recirculation of said memory.

* * * * *